United States Patent [19]

Karlquist

[11] Patent Number: 4,785,415
[45] Date of Patent: Nov. 15, 1988

[54] DIGITAL DATA BUFFER AND VARIABLE SHIFT REGISTER

[75] Inventor: Richard K. Karlquist, Cupertino, Calif.

[73] Assignee: Hewlett-Packard Company, Palo Alto, Calif.

[21] Appl. No.: 901,866

[22] Filed: Aug. 29, 1986

[51] Int. Cl.[4] .................. G06F 3/00; 364 200 MS File; 364 900 MS File; 364 200; 364 900; 370 53; 370 84; 371 32; 371 49
[52] U.S. Cl. ...................................... 364/900; 364/200
[58] Field of Search ... 364/200 MS File, 900 MS File; 370/53, 84, 108; 371/32, 49; 375/118

[56] References Cited

U.S. PATENT DOCUMENTS

| | | | |
|---|---|---|---|
| 4,071,887 | 1/1978 | Daly et al. | 364/900 |
| 4,115,759 | 9/1978 | Besenfelder | 364/900 |
| 4,173,014 | 10/1979 | Leighou et al. | 371/49 |
| 4,220,997 | 9/1980 | Hager | 364/900 |
| 4,229,815 | 10/1980 | Cummiskey | 370/84 |
| 4,275,457 | 6/1981 | Leighou et al. | 364/900 |
| 4,322,844 | 3/1982 | Fellinger et al. | 364/900 |
| 4,422,171 | 12/1983 | Wortley et al. | 371/32 |
| 4,463,443 | 7/1984 | Frankel et al. | 364/900 |

Primary Examiner—Thomas M. Heckler
Assistant Examiner—Adolfo Ruiz
Attorney, Agent, or Firm—James M. Williams

[57] ABSTRACT

A combination FIFO buffer and programmable shift register having asynchronous input and output capabilities comprises a three stage system which synchronizes the incoming data stream with the memory input clock, buffers the incoming data stream and provides a variable delay for the data. The digital data stream from an input device is received by an input synchronizer having its input clocked at the clock rate of the input device clock and its output clocked at a higher internal clock rate. The data is written into two FIFO buffers, a master and a slave. The master buffer controls the read and write addresses of both buffers, so that the write address of the buffers advances only when valid data is written into the buffers, and the read address advances only when data is read out of the buffers. The slave buffer can be programmed with an offset in its read address, so it operates as a delay buffer. The data is read out of the buffers into an output synchronizer, having its input clocked at the internal clock rate its output clocked at the clock rate of the memory control.

8 Claims, 5 Drawing Sheets

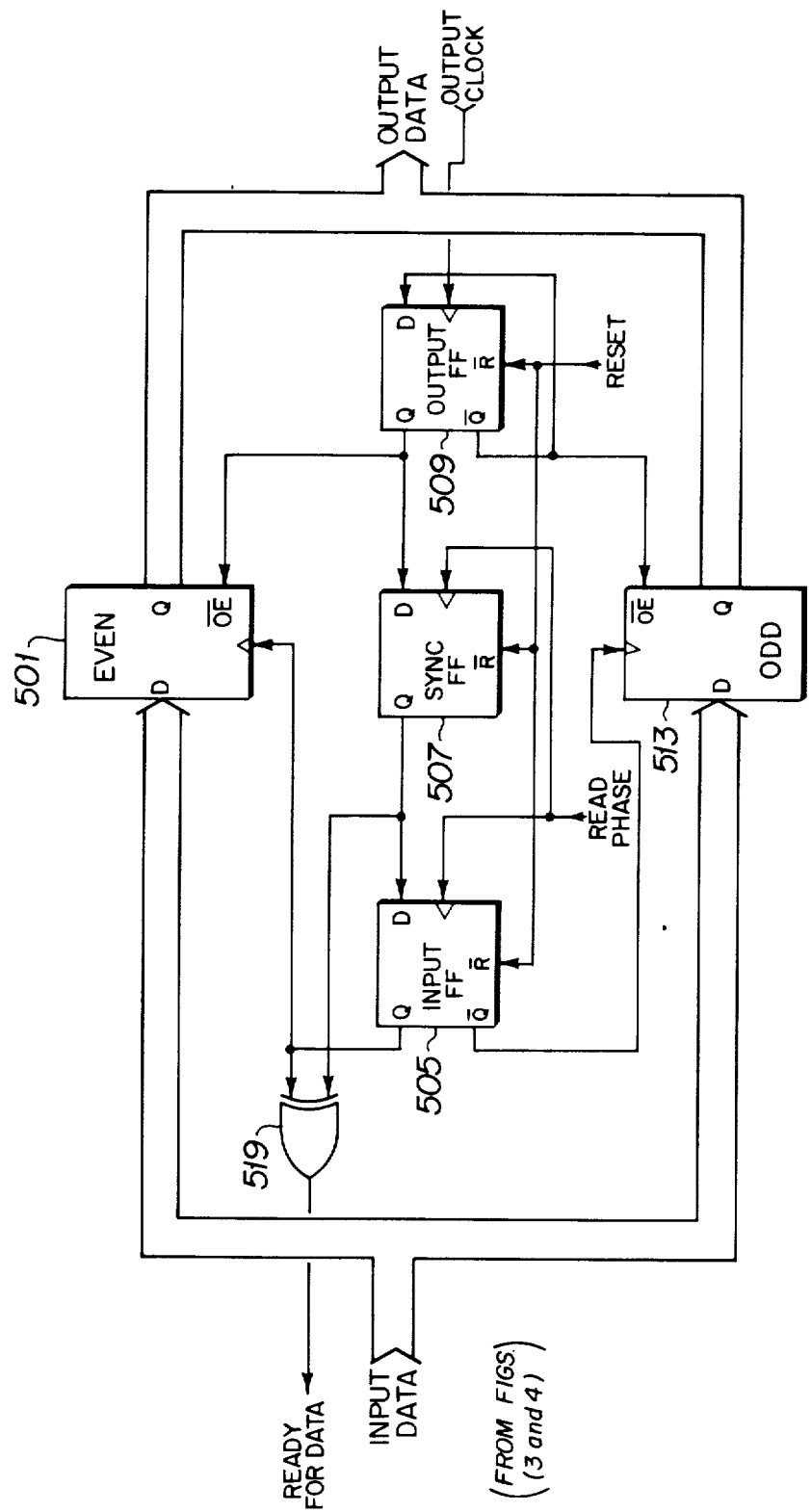

DIGITAL DATA BUFFER AND VARIABLE SHIFT REGISTER

BACKGROUND AND SUMMARY OF THE INVENTION

The invention relates to buffer memories for digital data storage systems, and in particular to data buffers for synchronizing, queuing, and delaying a high speed, asynchronous data and control signal input, such as from the analog to digital converter and timebase circuits of a digital oscilloscope. Other applications include magnetic media interfaces and video digital timebase correctors.

Digital oscilloscopes acquire and store digital data sampled from analog inputs. High sampling rates are used to gather as much information as possible about transient waveforms, resulting in the generation of huge amounts of data. Various techniques are used to alter the data flow into the digital data memory to maximize the utilization of the finite amount of available storage. These techniques increase the apparent size of the memory without losing any significant information. Examples include variable timebase rates, sampling only during specified trigger conditions, burst sampling, and adaptive sampling rate (based on evaluating the spectral content of the input signal in real time). These methods produce a variable rate of input data requiring a buffer to smooth the flow of data.

Another cause of uneven data flow is the use of dynamic-type memories (DRAMs). The data handling system must deal with the data that arrives during the refresh intervals of the DRAMs when the memory is inactive.

There is usually an unavoidable delay in the control circuits, especially spectrum estimator circuits for adaptive sample rate controllers. In order to make the control circuits appear to work in real time, it is necessary to delay the data by temporarily storing it (as in a shift register) to give the control functions time to catch up.

Finally, output synchronization may be necessary to deal with an external storage device.

Although these problems are discussed in connection with digital oscilloscopes, similar problems arise in magnetic media, video, and data transmission technology.

An object of the invention is to provide input synchronization, first-in-first-out (FIFO) buffering, shift register buffering for delay of data with respect to control signals, and output synchronization with a minimum amount of hardware.

Another object of the invention is to provide a unified hardware implementation for a combination FIFO buffer and programmable shift register having asynchronous input and output capabilities, which is not subject to errors due to metastable states.

In the preferred embodiment, a three stage system synchronizes the incoming data stream with the memory input clock, buffers the incoming data stream and provides a variable delay for the data. The digital data stream from an input device is received by an input synchronizer having its input clocked at the clock rate of the input device clock and its output clocked at a higher internal clock rate. The data is written into two FIFO buffers, a master and a slave. The master buffer controls the read and write addresses of both buffers, so that the write address of the buffers advances only when valid data is written into the buffers, and the read address advances only when data is read out of the buffers. The slave buffer can be programmed with an offset in its read address, so it operates as a delay buffer. The data is read out of the buffers into an output synchronizer, having its input clocked at the internal clock rate its output clocked at the clock rate of the memory control.

BRIEF DESCRIPTION OF THE DRAWINGS

FIG. 5 is a more detailed schematic block diagram of the output synchronizer shown in FIG. 1.

DETAILED DESCRIPTION OF THE INVENTION

Figure 1:
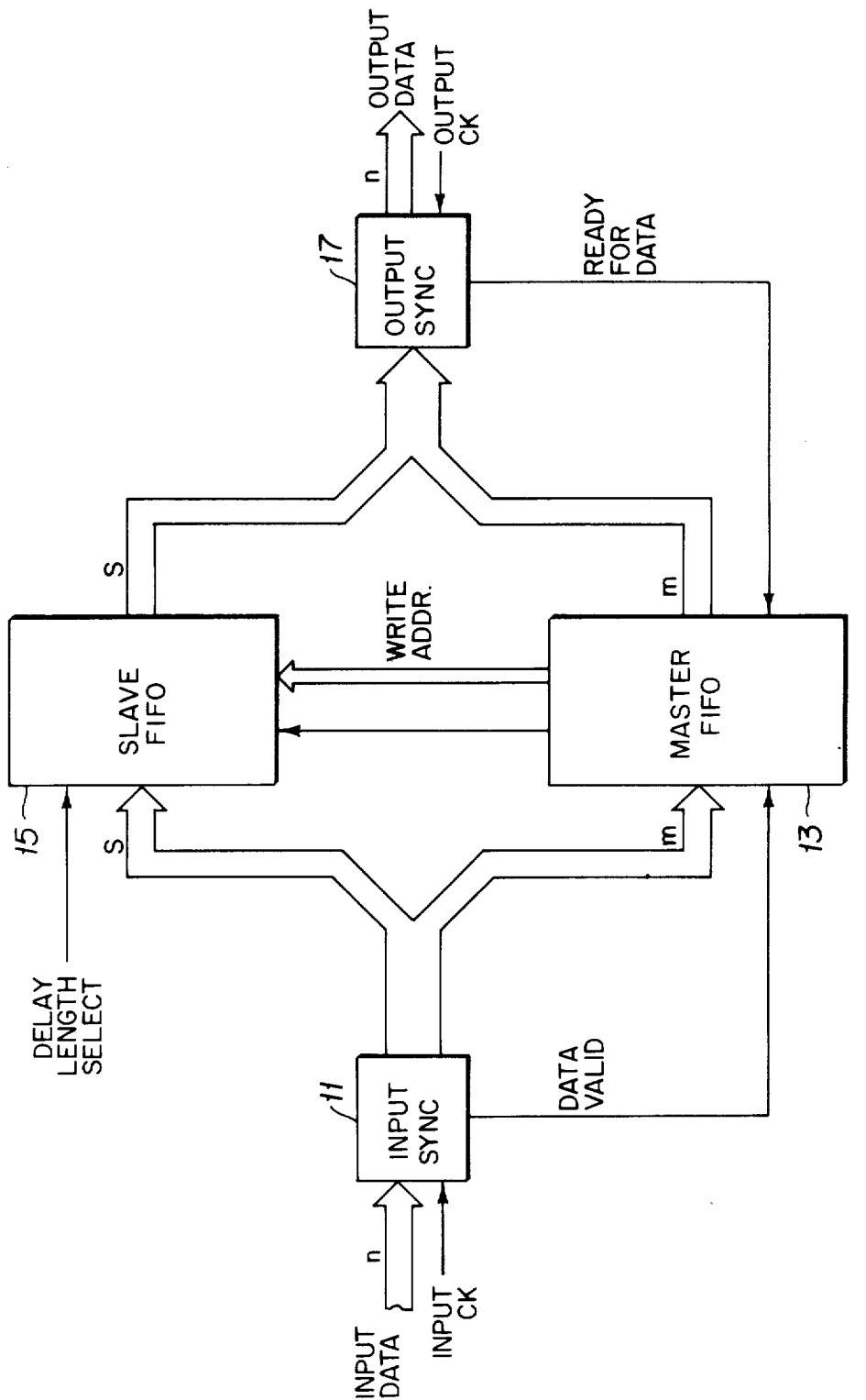
FIG. 1 is a schematic block diagram of a device constructed in accordance with the preferred embodiment of the invention.

FIG. 1 shows an overall block diagram of a FIFO buffer and delay register constructed in accordance with the preferred embodiment of the invention. Data consisting of n-bit wide words is clocked into the input synchronizer 11 by an input clock which is supplied by the same device that is supplying the input data. The data supplying device could be, for example, the ADC sampler of a waveform recorder When the data stream leaves the input synchronizer, it is synchronous with the "write phase" of the internal clock driving the FIFOs. The input synchronizer also provides a "data valid" signal, indicating that new data appears on its output bus. This signal is also synchronous with the internal clock.

The n-bit data stream is split into two data paths of width m bits and s bits. The m bits of data, typically control information, go to the master FIFO (with a buffering capacity of f words) and are passed along to the output synchronizer 17 as soon as the output synchronizer is ready to use them. The m bits that pass through the master FIFO are buffered but not delayed. The slave FIFO 15 operates under the control of the master FIFO 13 to buffer the s-bit data stream, and to delay the s-bit stream by effectively passing the data through a shift register of arbitrary length r. Hence, at least r words, and at most r+f words, are always in the slave FIFO 15.

The output synchronizer 17 recombines the m-bit and sbit data streams, and synchronizes the output data to an output clock supplied by the device utilizing the output data. The output synchronizer sends back a "ready for data" signal to the master FIFO, indicating that the data receiving device is ready, which is synchronous with the internal clock.

A internal FIFO clock produces a two phase internal clock signal, write phase and read phase, to control the FIFO RAMs, along with write enable strobes and select inputs for the RAM address multiplexers described below.

In some applications, either the input or the output synchronizer will be superfluous because the data will be processed or generated from a system which is also cloked from the internal FIFO clock. Also, it is possible to put a synchronous data processing machine before and/or after the FIFO section and retain both synchronizers.

Input Synchronizer

The purpose of the data synchronizer is to provide an interface between the data clock from the outside world and the internal memory system clock. The internal FIFO clock must run at least as fast as the outside data input clock, but the two will generally not be synchronous. This creates three problems for the input synchronizer. First, the output stage is going to overrun the input stage fairly frequently, i.e., be ready for data when no data is available. Some method of recognizing and reacting to the absence of output data is essential. Second, the circuit must be able to simultaneously receive input and send output data, the one coming in and the one going out. Third, the two clocks have a significant chance of becoming coincident, which will cause at least one flip-flop in any implementation to enter a metastable state. This undesirable condition must not be allowed to upset the sequence of operations in the circuit or corrupt the output data.

Figure 2:
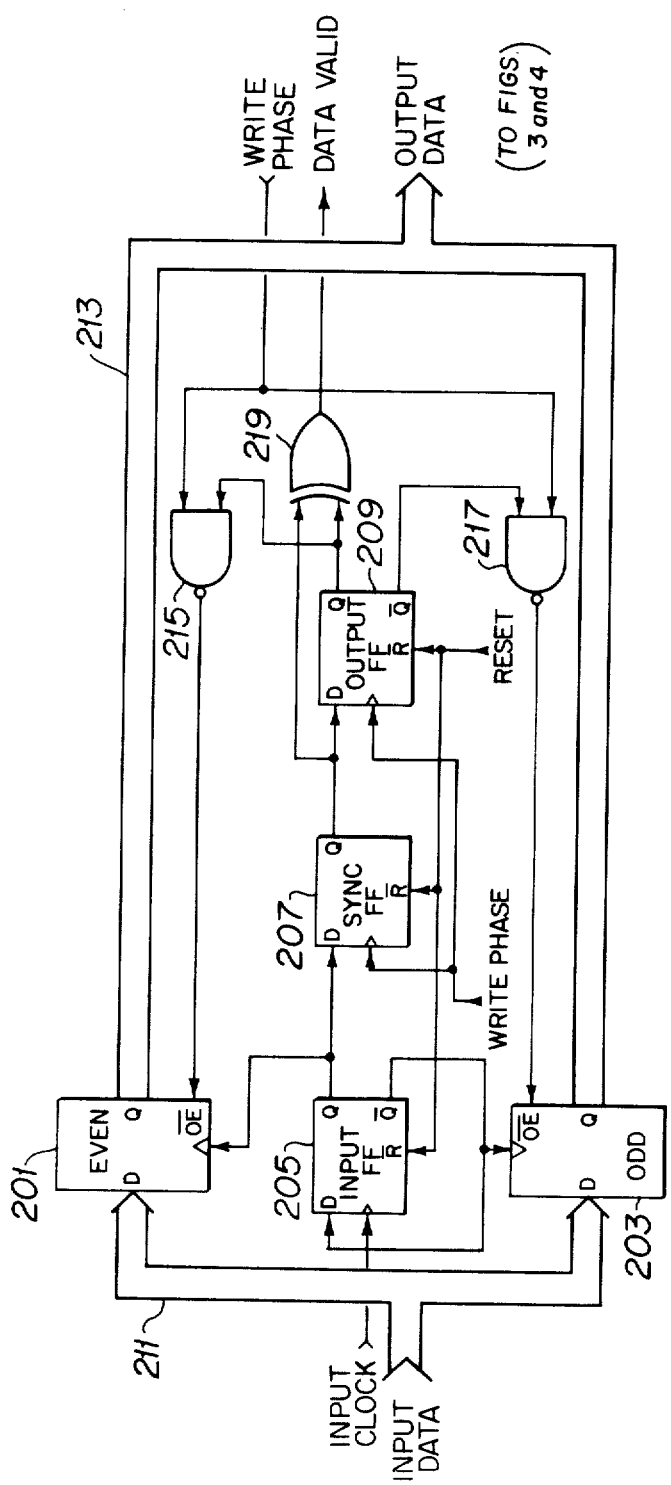
FIG. 2 is a more detailed schematic block diagram of the input synchronizer shown in FIG. 1.

FIG. 2 shows a more detailed block diagram of the input synchronizer 11. The input synchronizer consists of two n-bit data registers, 201 and 203, with positive edge-triggered clocks and 3-state outputs with active LOW output-enable control, three D-type positive edge-triggered flip-flops, 205, 207 and 209, two NAND gates, 215 and 217, and an exclusive-OR gate, 219. (In the discussion that follows, the first data word after power up is considered to be number zero and hence is an even-numbered data word.)

The two data registers, even register 201 and odd register 203, are connected in parallel to the incoming data on data bus 211. The input flip-flop 205 has its D input connected to its Q-bar output so that it operates in toggle mode. The input flip-flop 205 is clocked by the external data input clock, so during even-numbered input clock periods the input flip-flop 205 is in the low state and during odd-numbered clock periods, it is in the high state. Even register 201 is clocked from the Q output of flip-flop 205 and odd register 203 is clocked from the Q-bar output of flip-flop 205. Hence, even register 201 clocks in even-numbered data words at the end of even numbered clock periods, and odd register 203 clocks in odd-numbered data words The data output ports of registers 201 and 203 are connected in parallel to output data bus 213 to transfer data to the master and slave FIFOs.

The Q output of flip-flop 205 also drives the D-input of the sync flip-flop 207 which is clocked by the WRITE PHASE from the internal FIFO clock and thus synchronizes changes in the state of the input flip-flop to the internal clock. Synch flip-flop 207 inherently has some probability of entering a metastable state when the input and internal clocks are changing state simultaneously. However, it has the entire period of the internal FIFO clock (less set-up time of the next stage and the propagation delay of the gate) to exit the metastable state. Typically, 50 to 200 nsec. need to be provided for this to occur, depending on the logic family and bit error rate tolerance.

The Q output of synch flip-flop 207 drives the D input of output flip-flop 209 which is also clocked by the WRITE PHASE from the internal FIFO clock. The Q outputs of synch flip-flop 207 and output flip-flop 209 are applied to exclusive-OR gate 219. The Q and Q-bar outputs of flip-flop 209 are applied respectively to NAND gates 215 and 217, which also receive the WRITE PHASE signal from the internal FIFO clock. The output of NAND gate 215 is applied to the output enable terminal of even register 201, and the output of NAND gate 217 is applied to the output enable terminal of odd register 203.

If the sync flip-flop 207 detects a change in state of the input flip-flop 205, then on the next internal clock edge the sync flip-flop will be in the state opposite that of the output flip-flop 209. The exclusive-OR gate 219 will go high indicating "data valid". The input synchronizer assumes that the FIFO sections clock the data in on this edge. The other event which occurs on a data valid edge of the internal FIFO clock is that the output flip-flop will change state, and enable the 3-state output of the opposite register. This acts like a data switch and makes the next word of data available to the FIFOs. Note that this implementation saves an n-bit multiplexer. After the output register changes state, it will cause the inputs of the exclusive-OR gate 219 to be the same and the "data valid" signal will go false. As long as the FIFOs take the data away at least as fast as it comes in, no data will be written over before it is clocked out.

In operation, data is clocked alternately into the odd and even registers and simultaneously read out of the registers in a way that when a word is coming into one register the previous word is being clocked out of the other register. This guarantees that the data will not be changing as it is read out, regardless of the relative timing of the external clock and the internal clock. This solves the simultaneous reading and writing problem mentioned above.

The input flip-flop 205, clocked by the external clock, and the output flip-flop 209, clocked from the internal FIFO clock, are connected through a synchronizing flip-flop 207 which provides are transition between the two different clocks in the system. This solves the metastable state problem. Previous implementations have needed cumbersome and critical timing circuits involving delay lines or one-shot multivibrators to control metastable behavior.

The exclusive-OR gate 219 generates the "output data valid" signal only when a new data word was clocked into the input synchronizer during the previous internal FIFO clock period. The signal "data valid" goes high during the same internal clock period that the data it refers to is valid. This allows the FIFOs to handle the problem of the synchronizer running out of data.

Master FIFO

The master FIFO 13 is used only for the m-bit control signal associated with the data stream. However, it is an integral part of the pipeline FIFO used for the s-bit data stream. This is because it handles the housekeeping details having to do with how full or empty the FIFO buffer is. It also shares part of the write counter 303.

The purpose of the FIFO (First-In-First-Out) buffer is to smooth out variations in the rate at which data is output, for example to a downstream storage memory, and to temporarily hold data if the downstream memory is unable to accept data, for example during memory refresh cycles. FIFO 13 can hold up to f+1 words. Data is written in only when the data from input synchronizer 11 is valid and is read out only when the FIFO contains valid data and the output synchronizer 17 is ready to receive data.

Unlike most FIFO implementations, this one is synchronous. Both input and output use the internal FIFO clock, although they run on different phases of it. Data is written into the FIFOs during one phase and read out during the other phase. Separate counters, 301 and 305, are used to sequentially address the RAM array 301 for writing and reading data. The counters wrap around when they reach terminal count (modulo $f+1$) which results in a recirculating memory of $f+1$ words. As long as the counters never differ by more than f, the "end" of the memory is never reached.

Figure 3:
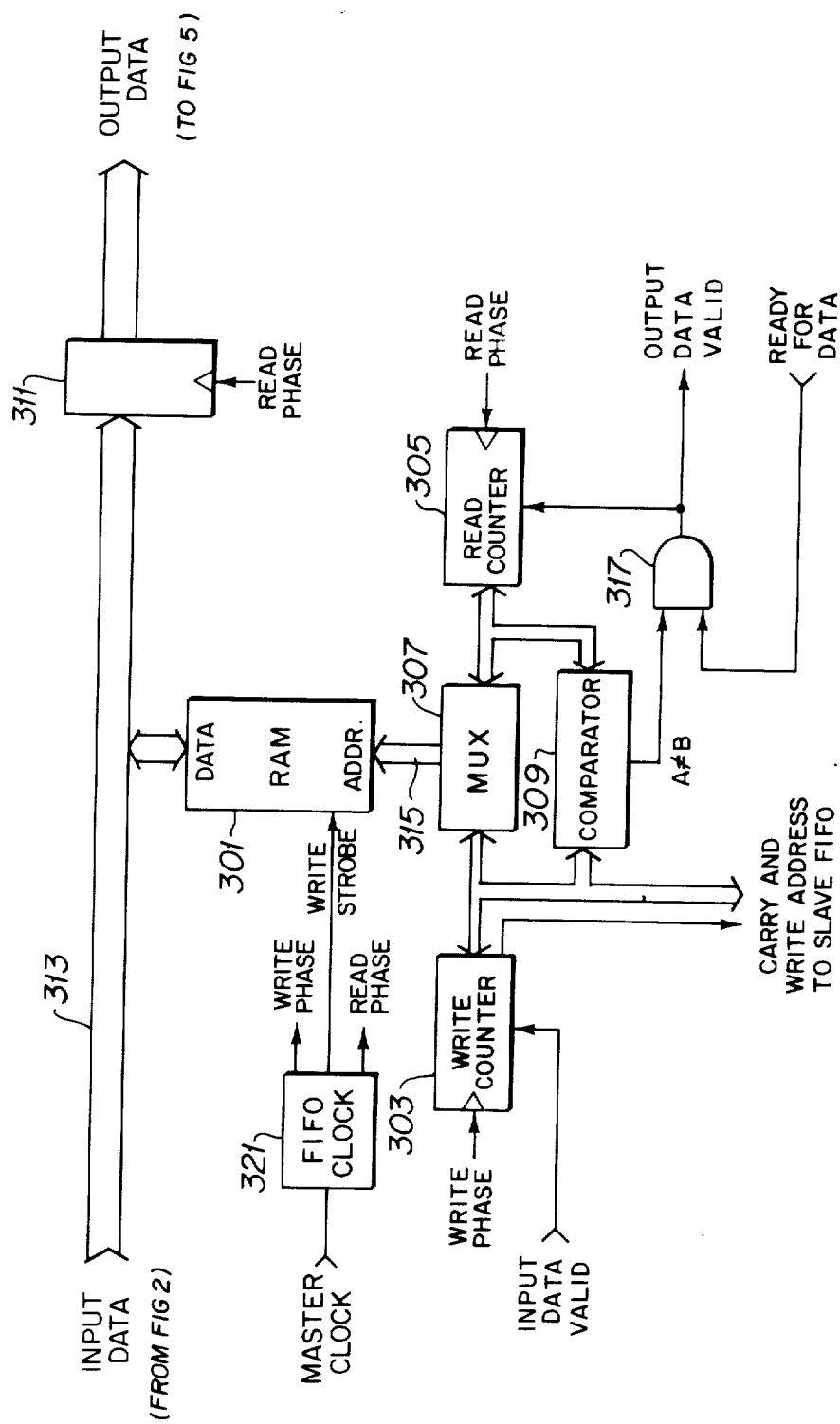
FIG. 3 is a more detailed schematic block diagram of the master FIFO memory shown in FIG. 1.

FIG. 3 shows a more detailed block diagram of the master FIFO 13, comprising static RAM array 301 capable of storing $f+1$ words of m bits each, counters 303 and 305 for read and write addressing, a read/write address multiplexer 307, comparator 309, and output register 311 to store data read out of the FIFO. The output register 311 corresponds to the registers of the output synchronizer 17, and is shown separately in FIG. 3 to simplify the description of the FIFOs. FIG. 3 also shows the internal FIFO clock 321.

The internal FIFO clock 321 produces a two phase internal clock signal. The internal clock frequency produces an internal data transfer rate slightly higher than the maximum expected average data input rate.

Phase 1 of the clock signal, the WRITE PHASE, is applied to the input synchronizer 11, the master FIFO 13 and slave FIFO 15. Phase 2 of the clock signal, the READ PHASE, is applied to the output synchronizer 17, master FIFO 13 and slave FIFO 15. In addition, the clock generator produces a WRITE STROBE signal during the phase 1 portion, which is applied to RAM 301 in the master FIFO 13 and to RAM 401 in the slave FIFO 15, and a control signal applied to multiplexer 307 in the master FIFO 13 and to multiplexer 407 in the slave FIFO 15.

RAM array 301 has a data port with shared input/output pins so that data bus 313 is used to connect together the two input synchronizer registers 201 and 203, the output register 311 and the data pins of RAM 301. During write operations, the appropriate register in the input synchronizer is enabled to drive bus 313. During read operations, the RAM 301 drives bus 313.

The read and write addresses for RAM 301 are generated by write counter 303 and read counter 305. Multiplexer 307 switches the address bus 315 between the read and write counters depending on the phase of the internal clock. The write counter 303 is clocked by the WRITE PHASE signal, but advances only when the data valid signal form the input synchronizer is valid. The read counter 305 is clocked by the READ PHASE signal, but advances only when the output data valid signal, described below, is valid. The difference between the two counters represents the number of words stored in the FIFO buffer. Hence the read counter is constantly chasing the write counter.

The outputs of the read and write counters are also applied to comparator 309, which generates a true output only when the counts are not equal, i.e., when the FIFOs are not empty. The comparator output and a ready for data signal from the output synchronizer 17 are applied to AND gate 317. AND gate 317 produces an output data valid signal which enables the read counter 305 and indicates to the output synchronizer 17 that there is valid data from the FIFOs on bus 313.

Incoming data is always written into the address that the write counter points to in the RAM address space, even if "data valid" is false. However, the write counter 303 advances to the next memory address only if the input data valid signal is true. Hence, invalid data is overwritten with valid data. Similarly, data is always read out of the RAMs onto bus 313, even if the FIFO is empty. However, the read counter 307 advances to the next memory address and the output synchronizer takes the data only when the output data valid signal is true, indicating that the FIFOs are not empty and the output synchronizer is ready for data.

During periods when the output synchronizer is not ready for data, the read counter 305 stands still while the new data coming in continues to advance the write counter 303. When the output synchronizer starts taking data again, the read counter will start incrementing toward the write counter. During some clock periods, the data coming into the FIFO will be invalid and the write counter will not advance. This will allow the read counter to move one word closer to the write counter. After enough such events, it will catch up and cause the comparator output to go false.

Slave FIFO

The s-bit data stream from the input synchronizer 11 passes thru the slave FIFO 15, which provides a programmable time delay for the data stream. The slave FIFO 15 is similar to the master FIFO in configuration and operation, but its address counters 403 and 405 have more bits to control the larger address space $(r+f+1)$ required for the time delayed data stream. FIFO 15 is referred to as a slave because the count enable signals from the master FIFO 13 are used to control the address counters of FIFO 15. The read counter 405 is preset to a delay value r address counts less than the write counter 303 when the FIFO is initialized. This offset is maintained during subsequent operation, resulting in an r word pipeline delay in the data path.

In a digital oscilloscope, for example, the delay r could be set to 2 with respect to the control stream through the master FIFO to allow the trigger circuit two clock periods to recognize a trigger event. Note that the delay is easily programmable to other values.

Figure 4:
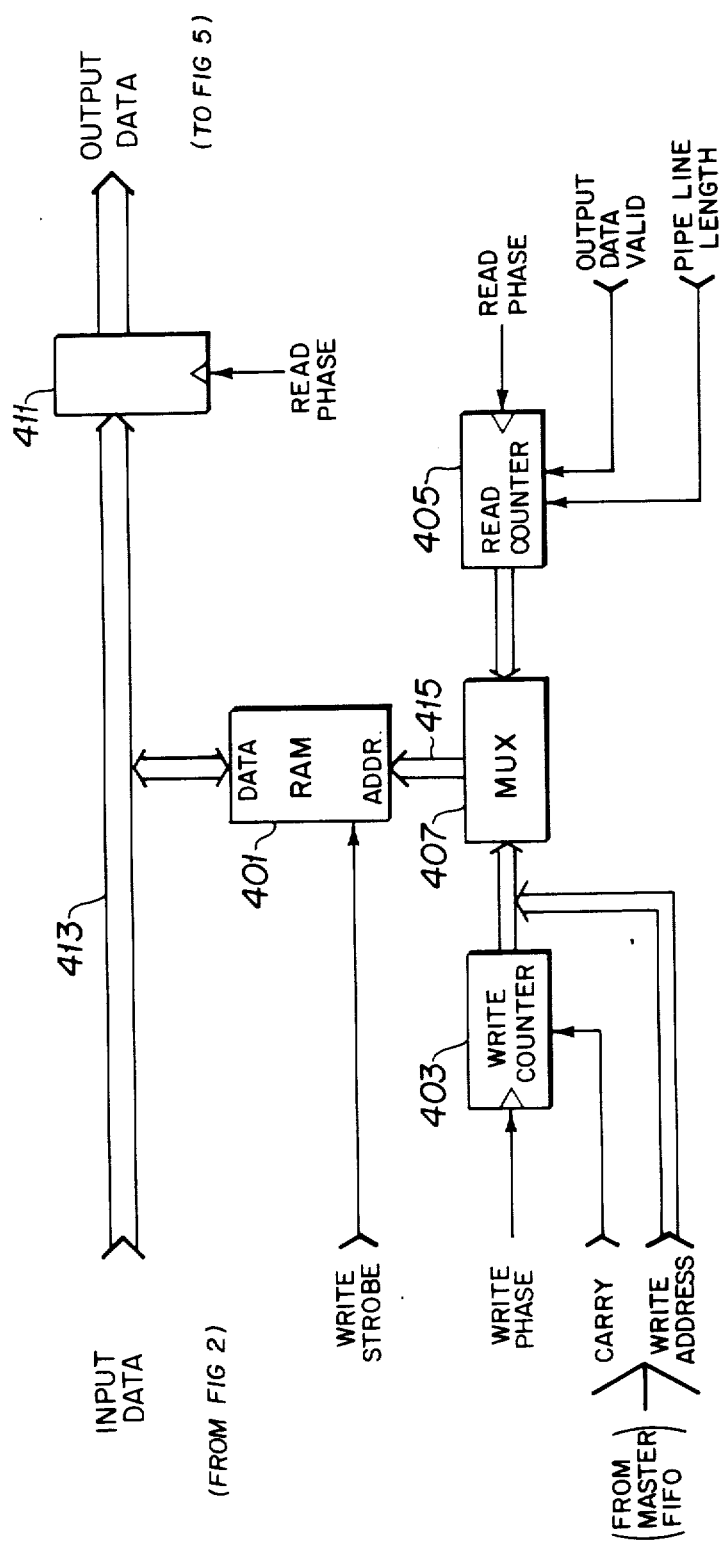
FIG. 4 is a more detailed schematic block diagram of the slave FIFO memory shown in FIG. 1.

FIG. 4 shows a more detailed block diagram of the slave FIFO 15, comprising static RAM array 401 capable of storing $f+r+1$ words of s bits each, counters 403 and 405 for read and write addressing, a read/write address multiplexer 407 and output register 411 to store data read out of the FIFO. The output register 411 corresponds to the registers of the output synchronizer 17, and is shown separately in FIG. 4 to simplify the description of the FIFOs.

RAM array 401 has data port connections like those of RAM 301, so that RAM 401 can read data from the input 411 on data bus 413. The read and write addresses for RAM 401 are generated by write counter 403 and read counter 405. Multiplexer 407 switches the address bus 415 between the read and write counters depending on the phase of the internal clock. The write counter 403 is clocked by the WRITE PHASE signal and advances only when the data valid signal from the input synchronizer is valid. The read counter 405 is clocked by the READ PHASE signal and advances only when the output data valid signal is valid, thus it is slaved to the buffering control logic of the master FIFO.

To provide the pipeline delay, the read oounter 405 is initialized at zero minus r by a PIPELINE LENGTH control signal and the write counter is initialized at zero.

As long as the counters remain in lockstep, there will be a delay of r words between input and output.

An alternative arrangement for the address counters is to use the master FIFO write counter 303 for the lower order bits of the slave FIFO write counter 403. The two write counters will count in exact synchronization and the lower bits of the two write counters will be identical if the size of the slave counter 403 is an integral multiple of the size of the master counter 303, since they are both initialized to zero. The advantage of this arrangement is that hardware can be saved by sharing the counting function for the lower order bits.

Because the two write counters and the two read counters move in lockstep, the size of the pipeline will expand and contract at the same rate as the master FIFO buffer expands and contracts. The slave FIFO read counter starts out r words behind so that it imparts an r-word delay. Therefore, there will always be r data words in a pipeline that is essentially independent of the variable number of words in the FIFO pipeline.

Output Synchronizer

The operation of the output synchronizer is similar to the input synchronizer 11 except that the clock control information propagates in the reverse direction, unlike the input synchronizer where the control information and the data flow in the same direction.

FIG. 5 shows a more detailed block diagram of the output synchronizer 17. The output synchronizer consists of two n-bit data registers, 501 and 503, with positive edge-triggered clocks and 3-state outputs with active LOW output-enable control, three D-type positive edge-triggered flip-flops, 505, 507 and 509, and an exclusive-OR gate, 519.

As with the input synchronizer, the two data registers, even register 501 and odd register 503, are connected in parallel to the incoming data on data bus 513. The output flip-flop 509 has its D input connected to its Q-bar output so that it operates in toggle mode. The output flip-flop is clocked by the external data output clock. Even register 501 is clocked from the Q output of flip-flop 505 and odd register 503 is clocked from the Q-bar output of flip-flop 505. Hence, even register 501 clocks in even-numbered data words and odd register 503 clocks in odd-numbered data words. The data output ports of registers 501 and 503 are connected on parallel to output data bus 513 to transfer data to the downstream memory device.

The Q output of flip-flop 509 drives he D-input of the sync flip-flop 507 which is clocked by the READ PHASE signal from the internal FIFO clock and thus synchronizes changes in the state of the input flip-flop to the internal clock. Synch flip-flop 507 inherently has some probability of entering a metastable state when the input and internal clocks are changing state simultaneously.

The Q output of synch flip-flop 507 drives the D input of input flip-flop 505 which is also clocked by the READ PHASE signal from the internal FIFO clock. The Q outputs of flip-flop 507 and input flip-flop 505 are applied to exclusive-OR gate 519. The Q and Q-bar outputs of flip-flop 509 are applied respectively to the output enable terminal of even register 501, and to the output enable terminal of odd register 503.

If the sync flip-flop 507 detects a change in state of the output flip-flop 509, then on the next internal clock edge the sync flip-flop will be in the state opposite that of the input flip-flop 505. The exclusive-OR gate 519 will go high indicating "ready for data". The output synchronizer assumes that the FIFO sections clock new data out on this edge. The other event which occurs on a ready for data edge of the internal clock is that the output flip-flop will change state, and enable the 3-state output of the opposite register. This acts like a data switch and makes the next word of data available on the output bus 513. After the input flip-flop changes state, it will cause the inputs of the exclusive-OR gate 519 to be the same and the "ready for data" signal will go false. As long as the data on output bus 513 as taken away at least as fast as it comes in, no data will be written over before it is clocked out.

In operation, data is clocked alternately into the odd and even registers and simultaneously read out of the registers in a way that when a word is coming into one register the previous word is being clocked out of the other register. This guarantees that the data will not be changing as it is read out, regardless of the relative timing of the external clock and the internal clock. This solves the simultaneous reading and writing problem mentioned above.

The input flip-flop 505, clocked by the READ PHASE signal from the internal FIFO clock, and the output flip-flop 509, clocked from the external clock, are connected through a synchronizing flip-flop 507 which provides are transition between the two different clocks in the system. This solves the metastable state problem.

The exclusive-OR gate 519 generates the "ready for data" signal only when a data word was clocked out of the output synchronizer during the previous internal clock period. The signal "output data valid" from the master FIFO allows the downstream data handling devices to handle the problem of the synchronizer running out of data.

What is claimed is:

1. A synchronous FIFO buffer memory for converting a variable rate input digital data stream clocked by an external input clock to an output digital data stream synchronized with an external output clock from a downstream device, wherein the external input clock and the external output clock are not synchronized with each other, comprising:

means for producing an internal clock signal with a frequency at least as high as the external clock frequencies, not synchronous with the input clock and the output clock;

an internal data bus;

an input synchronizer for receiving the input digital data stream and producing an output data stream on the internal data bus synchronized to the internal clock signal, said input synchronizer including a logic network that prevents the loss of data and violation of the setup and hold timing of the internal system clock upon occurrence of a metastable state caused by asynchronicity of the input clock and the internal clock;

a first FIFO memory connected to the internal data bus for receiving a first portion of the input digital data stream and temporarily holding the data until the downstream device is ready to receive the data;

a second FIFO memory connected to the internal data bus for receiving a second portion of the input digital data stream, reading data and writing data coincidentally with the first FIFO memory, and temporarily delaying a programmable number of data words, so that the second portion of the input digital data stream is delayed with respect to the first portion of the input digital data stream; and an output synchronizer connected to the internal data bus for receiving the data read from the first and second FIFO memories and producing an output digital data stream on an output bus connected to the downstream device, synchronized to the clock of the external downstream device.

2. The apparatus of claim 1, wherein the internal clock means produces a two phase signal having a write phase and a read phase, and wherein the input synchronizer comprises:

an input bus connected to the input digital data stream, an even storage register and an odd storage register with inputs connected to the input bus and outputs connected to the internal data bus, and a logic network comprising:

input logic means responsive to the external input clock and having outputs connected to the even register and to the odd register, for alternately clocking the input data into the even and odd registers synchronously with the input clock, synchronizing logic means responsive to the output of the input logic means and to the write phase of the internal clock to generate an output applied to an output logic means for preventing the loss of data and violation of the setup and hold timing of the internal system clock upon occurrence of a metastable state caused by asynchronicity of the input clock and the internal clock, and output logic means responsive to the write phase of the internal clock and to the output of a synchronizing logic means for alternately enabling the outputs of the even and odd registers synchronously with the internal clock, and for generating an input data valid signal when input data was received during the previous internal clock period.

3. The apparatus of claim 1 wherein the first FIFO memory is a master FIFO memory, the second FIFO memory is a slave FIFO memory and the master and slave FIFO memories share components including a comparator and one or more digits of a write address counter, and the master FIFO memory and the slave FIFO memory cooperate to programmably delay a first portion of the input digital data stream with respect to a second portion of the input digital data stream.

4. The apparatus of claim 3 wherein:

the master FIFO memory buffers input and output for the variable rate input digital data stream and provides a signal when the FIFO memory is empty, for synchronizing the output digital data stream, and comprises, a random access memory, capable of writing input data from the input synchronizer at a first address and reading output data at a second address, a write address counter clocked by the write phase of the internal clock signal and incremented only when the input data valid signal is present, having an output connected to the random access memory to control the first address, a read address counter clocked by the read phase of the internal clock signal and incremented only when an output data valid signal is present, having an output connected to the random access memory to control the second address, and means for comparing the output of the write address counter to the output of the read counter and generating the output-data-valid signal when the oututs are not equal, and a ready-for-data signal is present; and the slave FIFO memory comprises, a random access memory, capable of writing input data from the input synchronizer at a first address and reading output data at a second address, a write address counter clocked by the write phase of the internal clock signal and incremented only when the input data valid signal is present, having an output connected to the random access memory to control the first address, a read address counter having its initial count offset from the initial count of the write counter by said programmable number, clocked by the read phase of the internal clock signal and incremented only when the output data valid signal is present, having an output connected to the random access memory to control the second address.

5. The apparatus of claim 1 wherein the output synchronizer comprises:

an output bus connected to the downstream device, an even storage register and an odd storage register with inputs connected to the internal data bus and outputs connected to the output bus, and a logic network comprising:

input logic means responsive to the read phase of the internal clock signal and to an output from a synchronizing logic means, and having outputs connected to the even register and to the odd register, for alternately clocking the data from the FIFOs into the even and odd registers synchronously with the internal clock, and for generating the ready-for-data signal when output data was transmitted during the previous output clock period, synchronizing logic means responsive to the output of an output logic means and to the write phase of the internal clock to generate an output applied to the input logic means, and output logic means responsive to the external output clock having an output for alternately enabling the outputs of the even and odd registers synchronously with the external output clock.

6. The apparatus of claim 1 wherein the internal bus comprises a three state bus.

7. A data synchronizer for converting an input digital data stream synchronized with an input clock to an output digital data stream synchronized with an output clock from a downstream device, comprising:

an input bus connected to the input digital data stream;

an output bus connected to the downstream device;

an even storage register and an odd storage register with inputs connected to the input bus and outputs connected to the output bus;

a logic network comprising:

input logic means responsive to the input clock and having outputs connected to the even register and to the odd register, for alternately clocking the input data into the even and odd registers synchronously with the input clock, synchronizing logic means responsive to the output of the input logic means and to the output clock to generate an output applied to an output logic means for preventing the loss of data and violation of the setup and hold timing of the output clock upon occurrence of a metastable state caused by asynchronicity of the input clock and the output clock, and output logic means responsive to the output clock and to the output of the synchronizing logic means for alternately enabling the outputs of the even and odd registers synchronously with the output clock, and for generating an input data valid signal synchronous with the output clock when input data was received during the previous internal clock period.

8. The appartus of claim 7 wherein the output bus is a three-state bus.

* * * * *

UNITED STATES PATENT AND TRADEMARK OFFICE
CERTIFICATE OF CORRECTION

PATENT NO. : 4,785,415

DATED : Nov. 15, 1988

INVENTOR(S) : Richard K. Kariquist

It is certified that error appears in the above-identified patent and that said Letters Patent is hereby corrected as shown below:

Column 2, line 54, "sbit" should read -- s-bit --

Column 2, line 68, "cloked" should read -- clocked --

Column 6, line 66, "oounter" should read -- counter --

Column 10, line 2, "oututs" should read -- outputs --

Signed and Sealed this

Eighth Day of January, 1991

Attest:

HARRY F. MANBECK, JR.

Attesting Officer

Commissioner of Patents and Trademarks